Patented Apr. 25, 1939

2,155,843

UNITED STATES PATENT OFFICE 2,155,843

METHOD OF PURIFYING MILK

Richard W. Schmidt, Redondo Beach, Calif., assignor to The Evanston Company, Los Angeles, Calif., a corporation of Nevada No Drawing. Application December 29, 1937, Serial No. 182,257

3 Claims. (Cl. 99—151)

The object of the invention is to provide a method for freeing milk from coarse or fine sediment, animal tissue and bacteria.

The method consists substantially in filtering the raw or pasteurized milk, as the case may be, with a diatomaceous earth filter-aid, under certain limiting conditions as to temperature and dosage.

It has heretofore been proposed to filter milk with diatomaceous earth to remove bacteria, but this manner of filtration, so commonly practiced in other industries, has never come into use for this purpose. For this two reasons appear—the first, that the filter-aid tends strongly to remove butter fat and thus depreciate the value of the milk—the second, that suspensions of diatomaceous earth in milk often prove substantially or totally unfilterable.

I have discovered that by using very small quantities of diatomaceous earth filter-aid, as from 1/500 of 1% by weight upwardly to a limit (more or less ½ of 1%) which is fixed by increasing loss of butter fat, and by filtering at a temperature ranging from about 35° C. upwardly to pasteurizing temperature or even higher, I am enabled to remove substantially all or all of the bacteria present in the raw milk together with all coarser suspensoids such as cellular tissue material and accidental vegetable and mineral matter (e. g., dust) without appreciable loss of butter fat and at commercially feasible flow rates.

The very peculiar behavior of milk with diatomaceous earth filter-aids is clearly shown in the following table of flow-rates and butter fat losses.

In these experiments raw milk was dosed with the indicated proportions of two filter-aids, of which the one indicated as No. 1 has an extremely high clarifying power and a relatively low flow-rate, while the product indicated as No. 2 has a relatively high flow-rate and a somewhat lower clarifying or stopping power. The suspension of filter-aid in the milk was filtered under a gradually increasing pressure: 10# gauge for the first 3 minutes; 20# for the second 3 minutes; 30# for the third 3 minutes, and 40# for the remainder of the total filtering time of 21 minutes. Flow-rates are recorded in gallons per square-foot-hour. A closely woven cotton cloth such as is commonly used in straining milk was used as the supporting medium—this will stop coarse sediment but not fine dust, tissue debris nor bacteria. Butter fat determinations were made by the well known Babcock method and the loss figure reported is the difference between the original butter fat content (ranging from 3.4% to 4.2% on the unfiltered milks used as raw material) and the content after filteration.

| Filtration temperature °C. | Dosage (percent weight) | Filter-aid No. 1 | | Filter-aid No. 2 | |
|---|---|---|---|---|---|
| | | Flow rate | B. F. loss | Flow rate | B. F. loss |
| | | | Percent | | Percent |
| 15.5 | 0.05 | None | | 149 | 0.0 |
| | 0.10 | None | | 6 | 0.2 |
| | 0.50 | None | | None | |
| 30 | 0.05 | 3 | 0.6 | 38 | 0.2 |
| | 0.10 | 2 | 0.8 | 31 | 0.3 |
| | 0.50 | 1 | 1.1 | 21 | 0.6 |
| 35 | 0.50 | | | 102 | 0.2 |
| 40 | 0.05 | | | 208 | 0.05 |
| | 0.10 | | | 212 | 0.05 |
| | 0.50 | | | 209 | 0.1 |
| 50 | 0.05 | 64 | 0.0 | 271 | 0.0 |
| | 0.10 | 95 | 0.0 | 208 | 0.0 |
| | 0.50 | | 0.2 | 267 | 0.2 |
| 60 | 0.05 | 113 | 0.0 | 449 | 0.0 |
| | 0.10 | 118 | 0.0 | 450 | 0.0 |
| | 0.50 | 51 | 0.2 | 252 | 0.2 |

In connection with the above figures the following observations may be made:

In the attempt to filter with the No. 1 filter-aid at normal temperatures (the 15.5° tests) only a few drops of filtrate were received, even at 40# gauge pressure. Further additions of filter-aid, continued until 4% by weight had been added, did not produce any filtrate, the cake continuing to be impermeable;

In the similar filtration with the No. 2 filter-aid the smallest dose (0.05%) gave a satisfactory flow-rate but produced no useful result. The effect was solely that of straining and bacteria were not removed. When the dose was increased to 0.10% the flow almost ceased and with a dose of 0.50% there was no flow whatever;

On increasing the filtration temperature to 30° C. there was a slight flow through the closer filter-aid (No. 1) with a very high loss of butter-fat, and a somewhat greater flow through the more open filter-aid with a diminished but still prohibitive fat loss:

Between 30° and 40° C. the flow-rate increases greatly and the loss of butter fat practically or entirely disappears. These conditions persist at higher temperatures, up to that of pasteurization, beyond which experimentation was not carried because of depreciation of flavor of the milk at higher temperatures.

There is a marked coincidence between the melting point of butter fat (31° to 31.5° C.) and the rapid change in both flow-rate and butter fat loss which occurs between 30° and 35°. It is difficult to avoid the conclusion that the critical temperature is that at which the butter fat becomes fluid and permits the distortion of the fat globule and its passage through channels in the filter cake which would be impermeable to the spherical globule. In no other way can the passage of the butter fat particles through a medium which retains the much smaller bacteria be explained.

That the filter cake which passes the entire measurable content of butter fat is capable of substantially sterilizing the milk is shown by the following experiment in which a raw milk very high in bacteria was filtered, first through the cloth support alone, then with the addition of 0.10% of the No. 2 filter-aid. Cultures made in the usual manner of 1 ml. of a 1/100 dilution of the raw milk and each of the products gave the following results:

Raw milk—culture disc completely filled, no count possible;
Milk through cloth only—count 300 per sq. in.
Milk with filter-aid—count 3 per sq. in.
Butter fat loss with filter-aid—None.

In the same experiment it was noted that the dried filter cake lost 34% of its weight on ignition. As the filter-aid was a calcined product, none of this loss can be ascribed to water of hydration, and I am inclined to believe that the entire impenetrability of the low temperature cake, even with large doses of filter-aid, is due to adsorption on the diatoms of some constituent of the milk (probably casein) by which the normal dimensions of the capillaries existing in the filter cake are materially reduced.

I claim as my invention:

1. The method of purifying milk which comprises: suspending in said milk a chemically inert diatomaceous earth filter-aid in a proportion ranging from 0.05% to 0.50% of the weight of said milk, and filtering said suspension at a temperature not below the melting point of the butter fat of said milk.

2. The method of purifying milk which comprises: suspending in said milk a chemically inert diatomaceous earth filter-aid in a proportion ranging from 0.05% to 0.5% of the weight of said milk, and filtering said suspension at a temperature not substantially below 35° C.

3. The method of purifying milk which comprises: suspending in said milk a chemically inert diatomaceous earth filter-aid in a proportion ranging from 0.05% to 0.5% of the weight of said milk, and filtering said suspension at a temperature ranging from substantially 35° C. to substantially 60° C.

RICHARD W. SCHMIDT.